United States Patent Office 2,986,388
Patented May 30, 1961

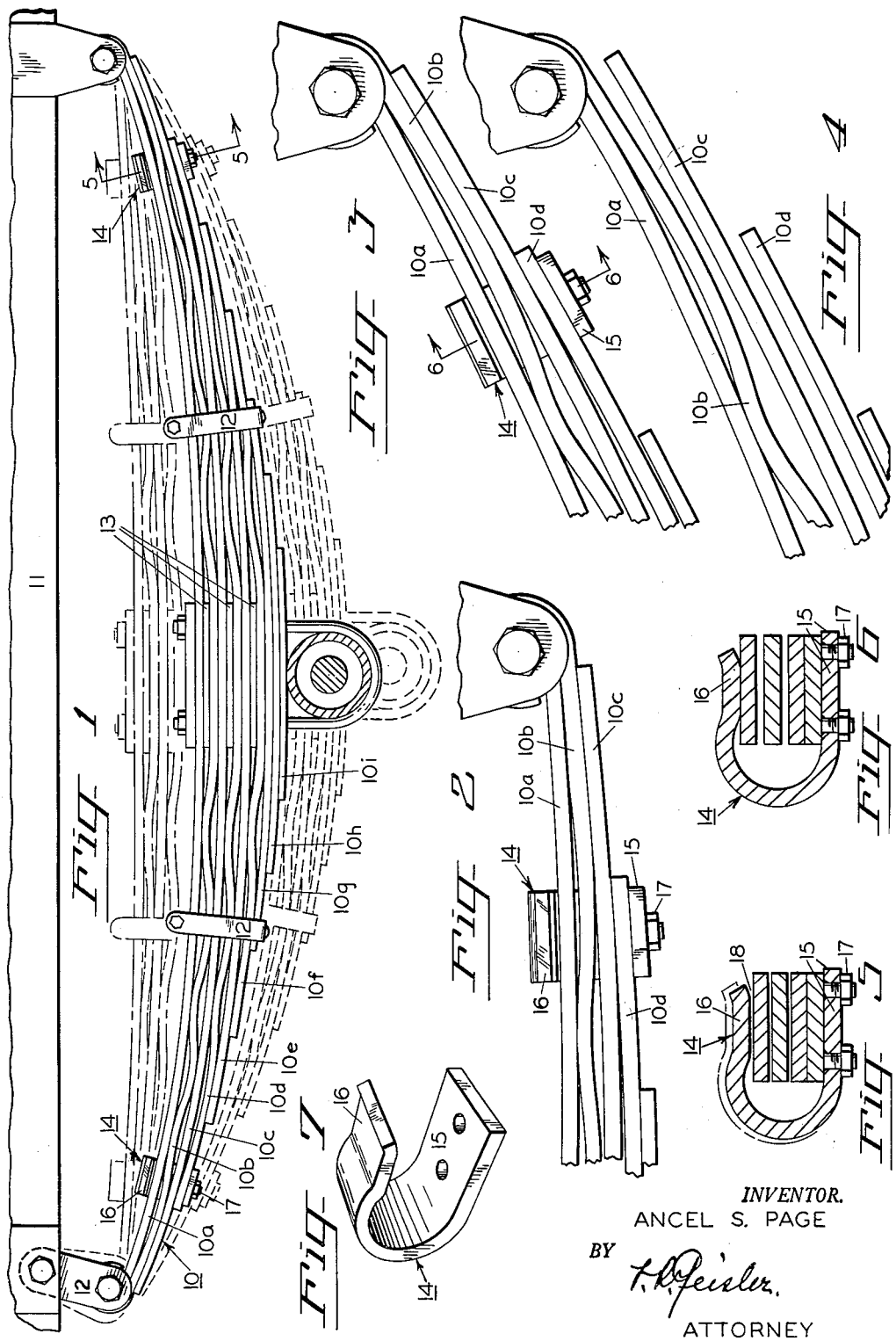

2,986,388
ATTACHMENT AND SHOCK ABSORBER FOR LEAF SPRINGS
Ancel S. Page, 0605 SW. Curry St., Portland 1, Oreg.
Filed Feb. 11, 1959, Ser. No. 792,634
2 Claims. (Cl. 267—53)

This invention relates to leaf or laminated springs and, more particularly, to the semi-elliptical springs of this type employed as the spring mounting for vehicles. Such springs are made up of an assembly of separate plates or leaves of varying lengths superposed upon each other, the leaves being clamped together only at the center of the assembly, and, when the spring is in normal position, with the free ends of the leaves of varying lengths bearing against the adjacent longer leaves in succession.

When such a vehicle spring is subjected to a load or shock the curvature of the entire assembly is temporarily reduced, the greatest amount of such deflection or reduction in curvature occurring in the longest leaves of the spring. The vehicle load imposed on the leaf spring assembly is transferred to the spring assembly through the ends of the longest leaves and thence to the vehicle ground engaging means on which the spring assembly is supported at the center; and similarly the shocks received by the vehicle ground engaging means and delivered to the center of the spring assembly are transmitted, after some absorption by the spring assembly, to the vehicle through these ends of the longest leaves.

A leaf spring, like any other spring, after being subjected to a shock load or deflection, rebounds with a tendency to oscillate, with the succeeding oscillations diminishing in amplitude In vehicles in which the body of the vehicle is mounted on leaf spring assemblies it is customary to provide separate so-called shock absorbers of various types to control such rebound and dampen the oscillation The object of the present invention is to provide simple means on the leaf spring assembly itself, which will act to reduce the rebound and dampen the oscillation without the aid of any separate shock absorbers, thus making the customary separate shock absorbers less necessary and even enabling them in some instances to be eliminated entirely.

Ordinarily the rebound of a leaf spring after a load shock causes the free ends of the leaves momentarily to separate slightly from the adjacent longer leaves respectively, such separation being greatest in the case of the longest leaves having such free ends. The reason for this can be readily understood in view of the fact that, as previously mentioned, the greatest curvature, and consequently the greatest deflection, occurs in the longest leaves. After observing the action of leaf spring assemblies under various load and shock conditions it occurred to me that if such separation of the free ends of the leaves from adjacent leaves in a leaf spring assembly during the rebound or shock could be controlled and restricted, particularly in the case of the long leaves, the rebound and oscillation of the entire spring assembly could be reduced and dampened. Subsequent experiments and tests proved this to be true. Consequently a related specific object of the invention is to provide a simple and practical attachment for each side of a leaf spring assembly which will modify the rebound of the long leaves and dampen the rebound oscillation and thereby function in the nature of a so-called shock absorber in the operation of the assembly.

The nature and form of such attachment and the manner in which a pair of such attachments will function on a leaf spring assembly will be briefly described and explained with reference to the accompanying drawings:

In the drawings:

Fig. 1 is a side elevation of a vehicle leaf spring assembly having a pair of the special attachments mounted in place thereon, this figure showing in full line the normal position of the assembly, indicating in dot and dash line the position into which the assembly is thrust immediately upon receiving a load shock, and indicating in dotted line the extent of the subsequent rebound after the impact of the shock;

Fig. 2 is a fragmentary elevation, drawn to a larger scale, showing one end of the spring assembly of Fig. 1 when the assembly is in the load shock position corresponding to the upper or dot and dash line position of Fig. 1;

Fig. 3 is a similar fragmentary elevation, drawn to the same scale as Fig. 2, showing the same end of the spring assembly when the assembly has rebounded to the lower or dotted line position of Fig. 1;

Fig. 4 is a fragmentary elevation similar to Fig. 3 but illustrating the same end of the assembly in a similar rebound but without the special attachment on the assembly;

Fig. 5 is a section on line 5—5 of Fig. 1 drawn to the same scale as Figs. 2 and 3;

Fig. 6 is a section on line 6—6 of Fig. 3; and

Fig. 7 is a perspective view of one of the attachments for the assembly shown entirely removed from the assembly.

In Fig. 1 the vehicle semi-elliptical leaf spring assembly 10 is shown as composed of nine separate leaves of varying lengths, these separate leaves being designated by the characters 10a, 10b, 10c, 10d, 10e, 10f, 10g, 10h, and 10i. The two longest leaves, namely 10a and 10b, are shown here as having their ends formed into eye loops to receive the bolts carried by the brackets and links by which the spring assembly is attached to the vehicle frame 11. This is one way in which such spring assemblies are customarily mounted on vehicles and is given as an illustration, but, as is well known, there are other ways in which the ends of the longest leaves are made to engage the bearing mounting means for the spring assembly on the vehicle. The spring assembly is clamped together in the center by means of the customary U-shaped bolts and clamping plates which also secure the spring assembly on the axle housing. Such vehicle spring mountings are so well known as to require no further description. The spring assembly 10 has the usual shackles 12 which aid in keeping the spring leaves aligned vertically while otherwise allowing the individual leaves freedom of movement. In the particular leaf spring assembly illustrated three of the leaves, thus 10b, 10d, and 10f, are shown formed with waves for the purpose of reducing the contact surface areas with adjacent springs, this modified spring construction also being old in the art, and in this modified construction additional spacer plates 13 are provided at the center where the leaves are clamped in place in the assembly. Regardless of whether some of the leaves are waved or whether all the leaves are flat, all the leaves, with the exception of the top leaf or leaves which have their ends connected with the mounting on the vehicle frame, will have substantially free flat ends which normally bear against the next longer leaf.

The present invention consists of a spring attachment 14 mounted near each end of the spring assembly. The attachment is substantially a U-shaped spring of heavy spring metal, the preferred shape of this attachment being shown best in Fig. 7. The attachment has a flat side 15, which, in the arrangement illustrated, constitutes the lower side, and an opposite shorter flat side 16 joined by a reverse curve with the connecting curved portion constituting the resilient portion of the clamp. The flat side 16 is substantially parallel to the side 15. The attachment is so mounted on the assembly as to extend over the topmost leaf 10a and to extend under the free end of one of the lower leaves, such as the leaf 10d, the latter terminating more than two-thirds of the distance between the center of the assembly and the ends of the assembly. In the arrangement illustrated, the lower side 15 of the attachment 14 is secured to an end of the leaf 10d by suitable means, such as the screws and nuts 17, while the opposite side of the attachment extends over the top face of the top leaf 10a with a slight clearance when the spring is in normal position.

In the carrying out of the invention it would be possible to reverse the mounting of the spring attachment 14 and thus have the side 15 secured on the top leaf 10a with the side 16 extending under the free end of one of the longer leaves such as the leaf 10d. The operation of attachment would be the same in either case. The spacing between the faces 15 and 16 of the attachment is such that there will be a slight clearance between the unattached face 16 of the attachment and the adjacent spring leaf (as shown at 18 in Fig. 5), thus allowing relative longitudinal movement of the leaves within the attachment with respect to each other without any hindrance. At the same time the attachment prevents the free ends of the leaves within the attachment from moving very far in a vertical direction from the top longest leaves which have their ends attached to the end mounting for the assembly.

The manner in which this pair of attachments 14 modify the rebound of the assembly and thus dampen the oscillation will now be described. Let it be assumed that a wheel of the vehicle, of which the spring assembly 10 of Fig. 1 forms part of the spring mounting, encounters a sudden bump in the road bed during the travel of the vehicle. The shock received by the wheel with which the spring assembly is connected, when transferred to the spring assembly, will cause the spring assembly momentarily to assume some such position as that indicated by the upper dot and dash lines in Fig. 1. In other words, the leaves of the assembly, and particularly the upper longer leaves, will momentarily be thrust from their normal curvature into a flatter position. The right hand end of the spring assembly will be in the position shown more clearly in Fig. 2, the opposite end of the assembly being in a similar position. Now as the wheel moves down from the bump and the shock has expended itself, the spring assembly rebounds and in the rebound at first exceeds its normal curvature, moving into some such position as indicated by the lower dotted lines in Fig. 1 and as illustrated in Fig. 3. This rebound is produced mainly by the action of the longest leaves since, due to their length, they have been subjected to the greatest deflection. The shorter leaves, on the other hand, having suffered less deflection, have less rebound and remain more nearly in their normal position. Consequently, without the attachment 14 on each end of the assembly, the free ends of the leaves 10c and 10d for example would separate from the upper leaves 10a and 10b which have the greatest rebound, and the relative positions of these leaves would be somewhat as illustrated in Fig. 4. However, when the attachment 14 is placed near each end of the assembly, the ends of the leaves 10c and 10d are prevented from separating from the leaves 10a and 10b and will be held quite close against the upper leaves during the rebound, as illustrated in Fig. 3. As a result, the resistance of the shorter leaves 10c and 10d to excessive deflection acts as a dampener on the rebound movement of the leaves 10a and 10b and prevents these upper leaves from having the same amount of rebound which they would have if not hampered by their connection with the ends of the next lower leaves.

The attachment 14 itself has a certain limited amount of springiness, as indicated by comparison of Figs. 5 and 6, and this slight amount of resilience in the attachment itself adds a further slight amount of cushioning to the restraining force exerted by the shorter leaves.

Thus the pair of attachments 14, mounted near the respective ends of the spring assembly, by reducing the rebound and oscillation of the assembly under load shock, function to achieve the same purpose as the various types of separate shock absorbers heretofore generally considered as necessary auxiliary equipment with leaf spring vehicle suspensions. It will be found that, for commercial or load-hauling vehicles, on which extensive cushioning of all road shocks is not required, such attachments on the leaf springs obviate the necessity for the customary separate shock absorbers and thus save considerable equipment expense since these attachments are relatively inexpensive. On other vehicles, when a greater amount of cushioning is desired for leaf springs, these attachments reduce the work load for the added separate shock absorbers.

I claim:

1. In a leaf spring assembly of the character described having a long leaf connected at the ends with mounting means for the assembly, a pair of attachments for limiting the separation of some of the leaves of the assembly in the rebound of said assembly from shocks and thereby reducing such rebound, said attachments located near the ends of said assembly respectively at points equidistant from the center of said assembly, each of said attachments comprising a substantially U-shaped member having a pair of opposed normally parallel arms connected by an integral substantially semi-cylindrical spring portion, said arms extending transversely over the outer faces of said long leaf and of a shorter leaf respectively at the end of such shorter leaf, the inside spacing between said arms being slightly greater than the distance between said outer faces of said long leaf and said shorter leaf when said assembly is in normal position, one of said arms secured to the adjacent leaf of the assembly leaving the other arm normally spaced a slight distance from its adjacent leaf, whereby said attachments will prevent any substantial increase in the spacing between the included spring leaves during rebounds of the assembly, thereby reducing such rebounds, without the exertion of clamping pressure on the included leaves sufficient to impede slippage of the leaves with respect to each other.

2. In a leaf spring assembly of the character described having a long leaf connected at the ends with mounting means for the assembly, a pair of attachments for limiting the separation of some of the leaves of the assembly in the rebound of said assembly from shocks and thereby reducing such rebound, said attachments located near the ends of said assembly respectively at points equidistant from the center of said assembly, each of said attachments consisting of a substantially U-shaped member having a pair of opposed normally parallel upper and lower arms connected by an integral spring portion formed with a reverse curve leading to one of said arms, said upper arm extending transversely above said long leaf and said lower arm extending transversely beneath a shorter leaf near the end of said shorter leaf, the inside spacing between said arms being slightly greater than the distance between the top face of said long leaf and the bottom face of said shorter leaf when the assembly is in normal position, said lower arm secured to said shorter leaf and said upper arm thereby normally being spaced a slight distance above said long leaf, whereby said attachments will prevent any substantial increase in the spacing between the included spring leaves during rebounds of the assembly, thereby reducing such rebounds, without the exertion of clamping pressure on the included leaves sufficient to impede slippage of the leaves with respect to each other.

References Cited in the file of this patent

UNITED STATES PATENTS

| 1,628,386 | Blackmore | May 10, 1927 |
| 1,867,203 | Blackmore et al. | July 12, 1932 |
| 2,695,780 | Blair et al. | Nov. 30, 1954 |

UNITED STATES PATENT OFFICE
CERTIFICATION OF CORRECTION

Patent No. 2,986,388                                May 30, 1961

Ancel S. Page

It is hereby certified that error appears in the above numbered patent requiring correction and that the said Letters Patent should read as corrected below.

In the grant, lines 1, 2, and 3, for "Ancel S. Page, of Portland, Oregon," read -- Ancel S. Page, of Portland, Oregon, assignor to Dura Corporation, of Oak Park, Michigan, a corporation of Michigan, --; line 12, for Ancel S. Page, his heirs" read -- Dura Corporation, its successors --; in the heading to the printed specification, line 4, for "Ancel S. Page, 0605 SW. Curry St., Portland 1, Oreg." read -- Ancel S. Page, Portland, Oreg., assignor to Dura Corporation, Oak Park, Mich., a Corporation of Michigan --.

Signed and sealed this 31st day of October 1961.

(SEAL)
Attest:

ERNEST W. SWIDER
Attesting Officer

DAVID L. LADD
Commissioner of Patents